US007004329B2

(12) United States Patent
Magnan

(10) Patent No.: US 7,004,329 B2
(45) Date of Patent: Feb. 28, 2006

(54) CLASSIFYING STATION WITH DYNAMIC DECISION ZONE

(75) Inventor: Sylvain Magnan, Rosemère (CA)

(73) Assignee: Autolog Inc., Quebec (CA)

( * ) Notice: Subject to any disclaimer, the term of this patent is extended or adjusted under 35 U.S.C. 154(b) by 176 days.

(21) Appl. No.: 10/426,696

(22) Filed: May 1, 2003

(65) Prior Publication Data

US 2004/0040897 A1 Mar. 4, 2004

(30) Foreign Application Priority Data

May 1, 2002 (CA) .................................. 2382347

(51) Int. Cl.
*G01B 11/02* (2006.01)
*B07C 5/14* (2006.01)
*G06F 15/20* (2006.01)

(52) U.S. Cl. ...................... 209/517; 209/518; 209/521; 209/702; 209/703; 209/44.4; 209/630; 250/563; 250/559.08

(58) Field of Classification Search ................ 209/517, 209/518, 521
See application file for complete search history.

(56) References Cited

U.S. PATENT DOCUMENTS 4,992,949 A * 2/1991 Arden ........................ 700/223
5,412,220 A * 5/1995 Moore ................... 250/559.48
5,544,757 A * 8/1996 Geiger et al. ............... 209/518
6,072,890 A * 6/2000 Savard et al. ............... 382/110
6,614,041 B1 * 9/2003 Lappalainen et al. .. 250/559.08
6,851,559 B1 * 2/2005 Kairi .......................... 209/518

* cited by examiner

*Primary Examiner*—Donald P. Walsh
*Assistant Examiner*—Jonathan R Miller
(74) *Attorney, Agent, or Firm*—Baker & Hostetler LLP

(57) ABSTRACT

A classifying station for classifying a piece of wood in a wood processing plant, the classifying station including an area for an operator, a conveyor for transversely conveying pieces of wood before the area, and a console for entering classification related to a piece of wood to be classified, where the classifying station includes a dynamic classification zone located in front of the area having a predetermined length. The station also includes illumination elements adapted to selectively illuminate a piece of wood to be classified when the piece of wood is in the dynamic classification zone, the illumination elements being adapted to illuminate another piece of wood when the piece of wood has been classified; and control means for controlling the illumination means and operatively associated with the console in order to associate the illuminated piece of wood with information related to classification of the piece of wood entered by the user while the piece of wood is lit. The present invention enables a classifier to take more time to classify a more complex piece of wood, and less time for a less complex piece of wood.

5 Claims, 2 Drawing Sheets

CLASSIFYING STATION WITH DYNAMIC DECISION ZONE

FIELD OF THE INVENTION

The present invention relates to a classifying station with a dynamic decision zone, particularly useful in the wood processing industry.

DESCRIPTION OF THE PRIOR ART

In wood transformation plants, when the pieces of wood have to be classified, wood is conveyed transversely on a conveyor before an operator, whose role consists in classifying and giving instructions, particularly cutting instructions, to each piece of wood. Production lines operate at very high rates for long periods of time, often at more than 30 pieces per minute, leaving very little time to the operator to make a decision and requiring a great deal of concentration on his or her part. According to some studies, mistakes made at the classifying stations contribute to significantly diminish the monetary value of the results of the classification.

The duties of an operator in a conventional classifying station are generally as follows: following his or her judgement, the operator will activate appropriate buttons on a console when the piece of wood is present in a fixed zone well identified before him on the conveyor. Thus, all buttons pressed are memorised by a control computer and assigned to the piece of wood present within the fixed classifying zone. Later, during the control sequence of the process, the computer takes into consideration the buttons pressed for the piece of wood during its passage in the decision zone and will use this classification during ulterior steps of sawing and/or classifying of the piece of wood.

In a conventional classifying station, the operator has a fixed time of 1 lug (i.e. the distance between two pieces of wood)for classifying each piece of wood, whether or not the piece of wood be simple or complex to classify. It is not possible to take less time for simple pieces of wood and more time for more complex pieces of wood because the timing between the pressing of the buttons on the console and the linking of the pressed buttons to the piece of wood is fixed.

There is thus a need to provide an improved classifying station which enables a classifier to dynamically classify a piece of wood and to take more or less time for doing so depending on the characteristics of the piece of wood.

SUMMARY OF THE INVENTION

It is an object of the present invention to provide a classifying station which enables a classifier to dynamically classify a piece of wood.

In accordance with the invention, this object is achieved with: a classifying station for classifying a piece of wood in a wood processing plant, the classifying station including an area for an operator, a conveyor for transversely conveying pieces of wood before the area, and a console for entering classification related to a piece of wood to be classified, where the classifying station includes a dynamic classification zone located in front of the area having a predetermined length; illumination means adapted to selectively illuminate a piece of wood to be classified when the piece of wood is in the dynamic classification zone, the illumination means being adapted to illuminate another piece of wood when the piece of wood has been classified; and control means for controlling the illumination means and operatively associated with the console in order to associate the illuminated piece of wood with information related to classification of the piece of wood entered by the user while the piece of wood is lit.

BRIEF DESCRIPTION OF THE DRAWINGS

The present invention and its advantages will be more easily understood after reading the following non-restrictive description of preferred embodiments thereof, made with reference to the following drawings in which.

DESCRIPTION OF A PREFERRED EMBODIMENT OF THE INVENTION

Figure 1:
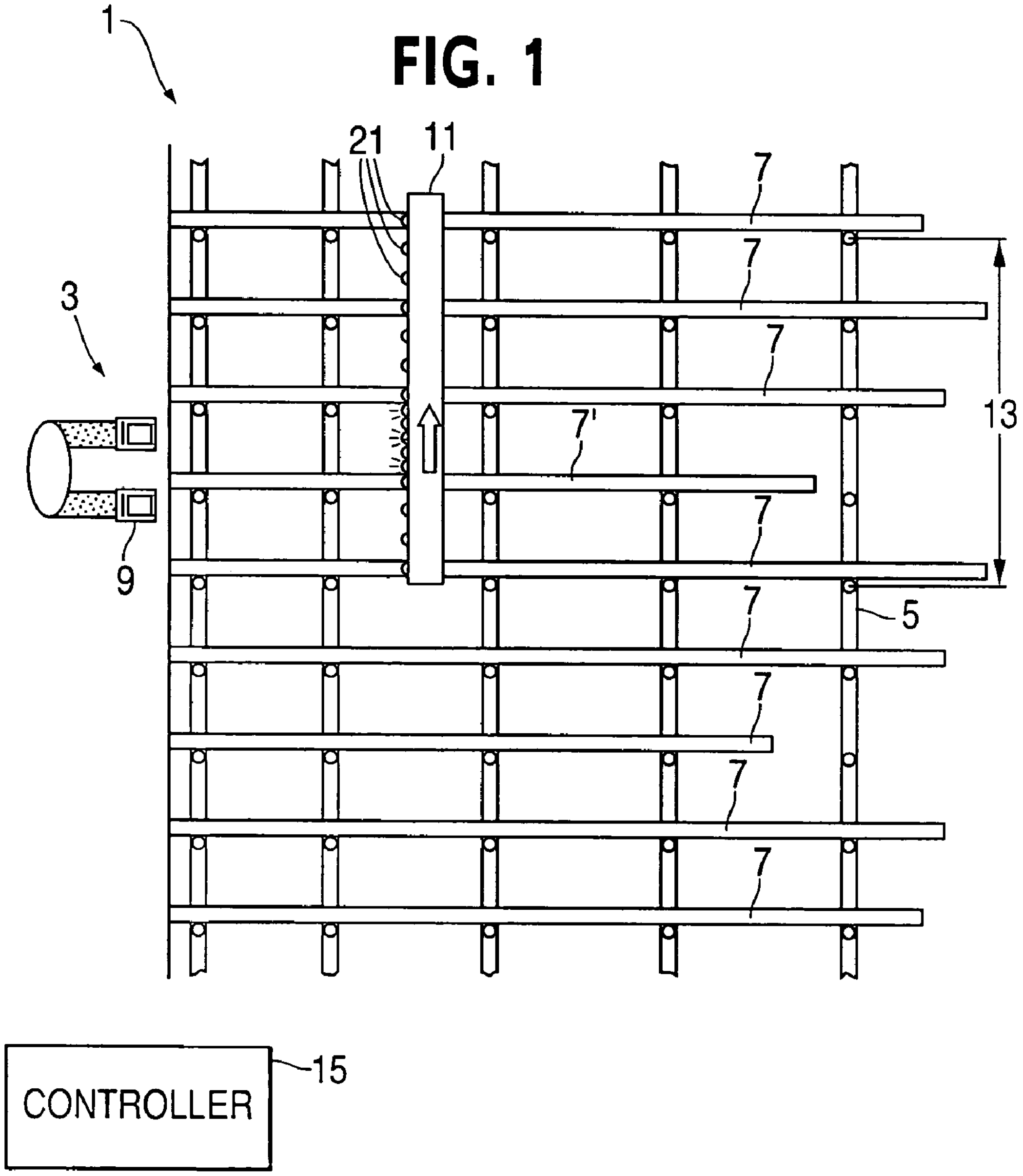
FIG. 1 is a schematic representation of a first preferred embodiment of the dynamic classifying zone according to the invention.

With the present invention, it is now possible to follow the rhythm of an operator by providing a dynamic decision zone for classifying the piece of wood, while maintaining the same rhythm of production of the process.

The present invention is used in a classifying station 1 in a wood processing plant. Such stations 1 include an area for a operator 3, a conveyor 5 for transversely conveying pieces of wood 7 and a console 9 for entering classification information related to a piece of wood.

A first embodiment for implementing the present invention of identifying and following the piece of wood, illustrated in FIG. 1, consists in defining a dynamic classifying zone 13 having a predetermined length of, for example, 4 lugs. The invention also provides for using at least one bar of light 11 of a predetermined length, preferably between 3 and 8 lugs. The light bar 11 is composed of light elements 21, such as light bulbs or LED, spaced apart by approximately one inch along the length of the bar of light, or other appropriate distance. The light bar 11 has a longitudinal axis which is parallel to the direction of travel of the piece of wood through the classifying station. If more than one light bar is used, they are parallel to each other.

Using a controller 15, preferably embodied by a computer, the light elements 21 are lit and turned off as the piece of wood to be classified 7' is conveyed over or under the light bar within the dynamic classifying zone 13. In order to identify the piece that has to be treated by the operator, the controller 15 lights the light elements 21 covering the piece along its width as well as some light elements on one side and the other of the piece of wood. As long as the piece of wood 7' is not classified, the light elements 21 follow and identify the piece to be treated as it travels along the conveyor 5. When the operator has pressed on the appropriate buttons on the console 9, the activated buttons are assigned to the illuminated piece 7'. Once this operation completed, the light elements that were lit are now turned off and the following piece of wood to be treated is lit. The operator activates the button for that piece and so on and so forth for all the pieces that go through the dynamic decision zone.

The light bar can be composed of many light elements of various colours in order to give further information on the piece of wood to be treated. For example, in certain plants that are more automated, if the piece of wood needs to be graded manually, red light elements can be used or if the piece of wood has an optimised grade of low quality, amber light elements can be used to indicate the piece of wood. Alternately, the piece of wood can be lit with a first color when the piece of wood has not yet been classified, and lit with a second color when the piece of wood has been classified. This can be useful to indicate to the operator that any button pressed will be associated with that piece of wood and that the information entered on the console has been received and memorized.

Figure 2:
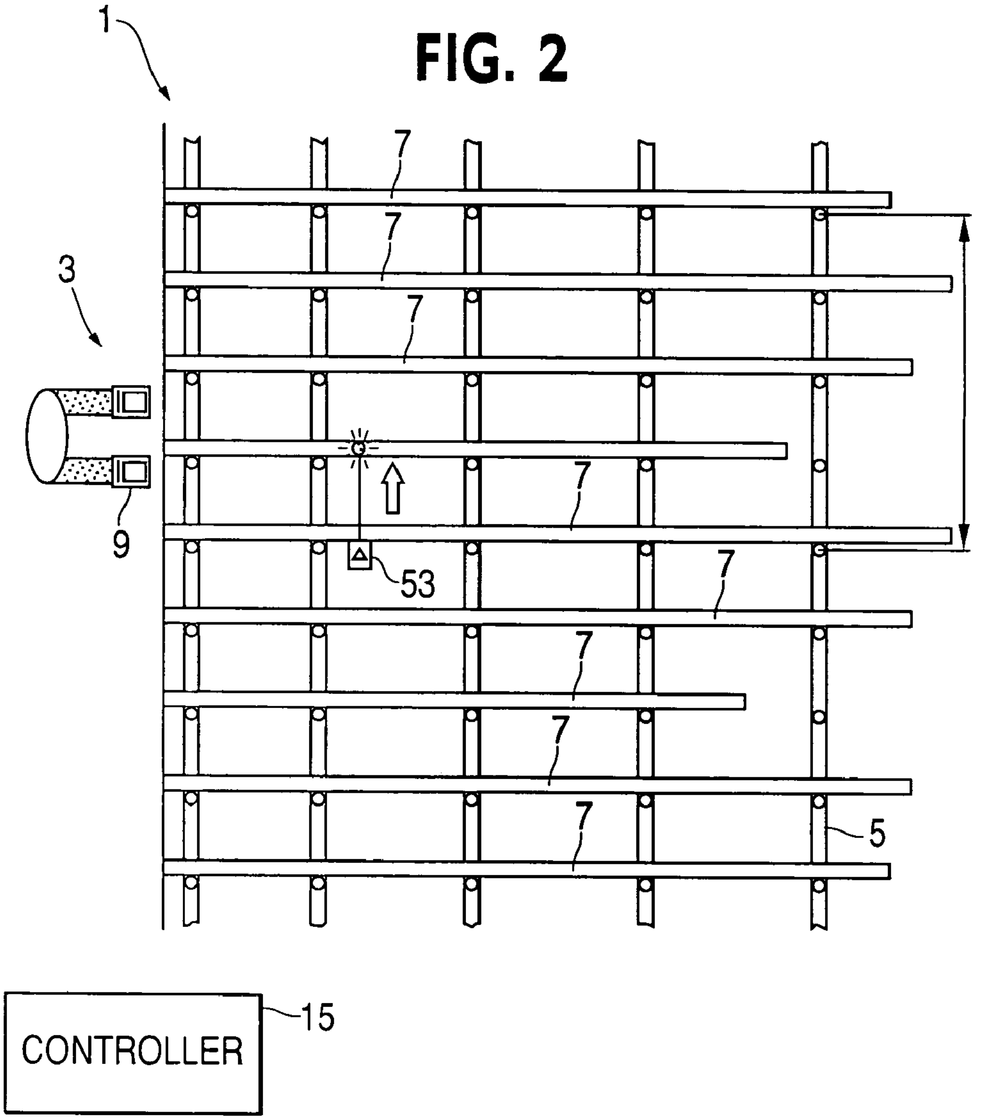
FIG. 2 is a schematic representation of a second preferred embodiment of the dynamic classifying zone according to the invention.

A second method for implementing the dynamic classifying zone according to the present invention, illustrated in FIG. 2 where like elements are identified by the same reference numbers, consists in using a light beam 51 such as a laser or other projected light on the piece to be classified 7', to indicate to the operator the piece of wood to be classified. This light beam 51, controlled by controller 15, also preferably includes a vision system 53 which detects the pieces of wood and is adapted to always project the light beam on the piece of wood to be treated by the operator. The operator activates the appropriate buttons on the console 9 in order to assign to the lit piece the desired classification. Once the piece has been classified by the operator, the light beam is directed automatically to the next piece of wood to be classified. The operator takes his decision and once again, the light beam is moved to light the following piece of wood on the conveyor which needs to be classified, and so on. In this embodiment as well, beams of different colours can be used to give further information to the operator.

Although the present invention has been explained hereinabove by way of a preferred embodiment thereof, it should be pointed out that any modifications to this preferred embodiment within the scope of the appended claims is not deemed to alter or change the nature and scope of the present invention.

What is claimed is:

1. In a classifying station for classifying a piece of wood in a wood processing plant, said classifying station including an area for an operator, a conveyor for transversely conveying pieces of wood before said area, a console for entering classification related to a piece of wood to be classified, wherein:

said classifying station includes a dynamic classification zone located in front of said area having a predetermined length;

illumination means adapted to selectively illuminate a piece of wood to be classified when said piece of wood is in said dynamic classification zone, said illumination means being adapted to illuminate another piece of wood when said piece of wood has been classified;

control means for controlling said illumination means and operatively associated with said console in order to associate the illuminated piece of wood with information related to classification of said piece of wood entered by said user while said piece of wood is lit;

wherein said illumination means is at least one light bar having a longitudinal axis parallel to a direction of conveying of said conveyor and a length corresponding to at least said predetermined length, said light bar having a plurality of light elements so that as said piece of wood travels through said dynamic classifying zone, said light elements are selectively lit to illuminate said piece of wood.

2. A classifying station according to claim 1, wherein said predetermined distance corresponds to four times, or more, a distance separating two pieces of wood.

3. A classifying station according to claim 1, wherein said light bar has light elements of at least two colors, a piece of wood being illuminated with a first color when said piece of wood is unclassified, and said piece of wood being illuminated with a second color when said piece of wood has been classified.

4. A classifying station according to claim 3, wherein said first color is amber and said second color is white.

5. In a classifying station for classifying a piece of wood in a wood processing plant, said classifying station including an area for an operator, a conveyor for transversely conveying pieces of wood before said area, a console for entering classification related to a piece of wood to be classified, wherein;

said classifying station includes a dynamic classification zone located in front of said area having a predetermined length;

illumination means adapted to selectively illuminate a piece of wood to be classified when said piece of wood is in said dynamic classification zone, said illumination means being adapted to illuminate another piece of wood when said piece of wood has been classified;

control means for controlling said illumination means and operatively associated with said console in order to associate the illuminated piece of wood with information related to classification of said piece of wood entered by said user while said piece of wood is lit;

wherein said illumination means is at least one light bar having a longitudinal axis parallel to a direction of conveying of said conveyor and a length corresponding to at least said predetermined length, said light bar having a plurality of light elements so that as said piece of wood travels through said dynamic classifying zone, said light elements are selectively lit to illuminated said piece of wood;

wherein said illumination means include a light beam adapted to follow said piece of wood inside said dynamic classifying zone until said piece of wood has been classified;

wherein said station further includes a vision system for visually following said piece of wood as said piece of wood travels inside said dynamic classifying zone.

* * * * *